United States Patent [19]

Neuman

[11] 3,993,902

[45] Nov. 23, 1976

[54] RADIOACTIVE LOGGING FOR DETERMINING OIL SATURATION IN A RESERVOIR

[75] Inventor: Charles H. Neuman, Placentia, Calif.

[73] Assignee: Chevron Research Company, San Francisco, Calif.

[22] Filed: Mar. 31, 1975

[21] Appl. No.: 563,921

[52] U.S. Cl. ............................... 250/258; 250/253; 250/270
[51] Int. Cl.² .......................................... G01V 5/00
[58] Field of Search ........... 250/258, 259, 262, 270, 250/253

[56] References Cited
UNITED STATES PATENTS

| | | | |
|---|---|---|---|
| 2,991,364 | 7/1961 | Goodman | 250/262 |
| 3,562,523 | 2/1971 | Richardson | 250/259 |
| 3,817,328 | 6/1974 | Neuman | 73/152 |

Primary Examiner—Harold A. Dixon
Attorney, Agent, or Firm—R. L. Freeland, Jr.; H. D. Messner

[57] ABSTRACT

A method is disclosed for determining oil saturation in a petroleum reservoir using logging signals indirectly related to the abundance of carbon nuclei in the reservoir rock. The first step of the invention is to record a log sensitive to the abundance of carbon nuclei after the region surrounding the well bore is caused to have oil saturations representative of the bulk of the reservoir. A purposeful change is then made in the fuel saturations in the region surrounding the well bore by injecting a liquid capable of displacing substantially all of the original fluids. The log is recorded a second time. The displacing fluid is then itself displaced by brine, and a third log is recorded. Oil saturation is then determined from differences between the logs and from known fractional volume carbon contents of the reservoir oil and the first injected liquid. It is not necessary that the log responses be independent of the material in the bore hole, the casing, the casing cement, or the reservoir rock. It is only necessary that changes in oil content cause proportional changes in log response.

7 Claims, 2 Drawing Figures

RADIOACTIVE LOGGING FOR DETERMINING OIL SATURATION IN A RESERVOIR

RELATED APPLICATIONS

The following applications filed concurrently herewith and assigned to the assignee of the present application are incorporated herein by reference: (1) Ser. No. 563,923, for "Low-Cost but Accurate Radioactive Logging for Determining Gas Saturation in a Reservoir", Charles H. Neuman, and (2) Ser. No. 563,922, for "Low-Cost but Accurate Radioactive Logging for Determining Water Saturation in a Reservoir", Charles H. Neuman.

FIELD OF THE INVENTION

This invention relates to radioactive logging methods. More particularly, it relates to the use of signals indirectly related to carbon nucleus concentrations to determine the fractional content of oil in a porous petroleum reservoir rock containing oil, water, and gas.

BACKGROUND OF THE INVENTION

Economic feasibility of methods for secondary and tertiary recovery of petroleum often depends on accurate measurement of the quantity and location of oil remaining in a formation after previous recovery processes have been completed. Such measurements are desirably carried out in "old" wells, i.e., in wells used to produce the formation. Reasons: (i) accuracy is increased; and (ii) costs are decreased; the process of drilling a new well displaces some fraction of the oil originally in the formation away from the hole, and it is desirable to evaluate the potential recovery from a reservoir without incurring the expenses of drilling a new well.

In my U.S. Pat. No. No. 3,817,328 for "Neutron Absorption and Oxygen Log for Measuring Oil Content of Formations", June 18, 1974, assigned to the assignee of this application, I describe a method for accurately determining the oil content of a reservoir containing both mobile oil and a significant gas saturation. The first step was the recording of the response of both a thermal-neutron-decay-time log and a neutron-activated-oxygen log to a formation traversed by a well bore. A purposeful change was then made in the oil saturation in a given region of the formation surrounding the well bore by injecting fluid under sufficient pressure to displace the connate fluids. This change could constitute the removal of substantially all the oil or the removal of as much oil as could be displaced by a proposed flooding technique. The combination of the thermal-neutron-decay-time log and the oxygen log was then run again to record the response of the same given region. The difference in the oil content around the well bore was determined from the differences between the two sets of logs.

My method may be somewhat limited, however, in some applications by the requirement that the oxygen activation log be calibrated at least to the extent that changes in log readings be proportional to changes in the oxygen content of the reservoir fluids with a predetermined single constant of proportionality. The response from logging tools currently available are unduly influenced—in some applications—by the pipe, cement, and liquids in the well bore; experience has shown that calibration valid at all depths in the well, is difficult (if not impossible) to achieve in such situations.

I am also aware of the contributions of others in the oil-content-measuring field. For example, pulsed-neutron-capture logs of the over-all cross-section for the capture of thermal neutrons by a rock matrix and reservoir fluids surrounding the well bore, have been proposed (see U.S. Pat. No. 3,562,523, J. E. Richardson and R. E. Wyman, or Pat. No. 3,631,245, J. R. Jorden, Jr. and F. R. Mitchell).

The above-mentioned methods for oil content measurement are only adequate, however, when the pulsed-neutron-capture cross-section of formation brine is known and is sufficiently different from that of oil. The methods have in common that they distinguish oil from formation brine through the greater absorption of thermal neutrons in the brine due to the presence of the chlorine nucleus therein. When the formation water is fresh, the pulsed-neutron-capture cross-section of the water and oil are so similar that the method loses sensitivity.

Furthermore, in many oil reservoirs, say the SACROC field in the West Texas region of the United States, while the produced brine may be saline enough that prior art methods could work, the brine in the formation often significantly varies between producing intervals. It has been common practice involving the injection of water into petroleum reservoirs for secondary recovery purposes (including the SACROC field) to inject brine with salinity different from that in the virgin reservoir. Thus, at the time that an accurate measurement of oil content is desired, the salinity of the water in the formation depends on the degree of flushing by injected water, which may be significantly different over the reservoir. If oil is known to be at a saturation so low that it is not changed by water flow, and there is no gas saturation, a logging measurement of saturation can be accomplished by injecting brine of known salinity prior to the start of the measurement.

The prior art has also provided several logs which serve as useful indicators of the presence of hydrocarbons, which can be run through casing, and which are based on measurements reflecting the abundance of elements other than chlorine. These include logs designed to reflect the activation of oxygen nuclei as well as logs designed to measure the inelastic scattering of nuclei by carbon and oxygen. Oxygen abundance can also be gained from background correction applied to some versions of pulsed-neutron-capture logs. But the recorded signals from each of the logging devices required to carry out the above-mentioned methods are only sensitive to the abundance of elements other than those of principal interest, and indicates the presence of oil rather than its abundance.

In summary, the existing prior art methods of which I am aware are not quantitative enough to provide accurate determination of the fractional content of oil in a reservoir rock containing oil, water, and gas, especially if the formation brine is non-saline and has been varied by previous waterfloods.

OBJECT OF THE INVENTION

It is the object of the present invention to provide a novel method for accurately measuring oil saturation in a formation penetrated by a well bore using logs that produce signals that not only vary linearly with fluid saturations but in a manner associated with other properties of the well bore and rock matrix, such that general calibration (and recalibration) of the logging tool that provide the logs is unnecessary.

SUMMARY OF THE INVENTION

In accordance with the present invention, signals indicative of the carbon nucleus concentrations in a porous reservoir rock containing oil, water and gas are obtained using a radioactive logging tool in a manner that allows the omission of general calibration (and recalibration) of the logging tool, even in applications where the reservoir is non-saline or where the formation brine has been significantly varied by previous waterfloods.

The first step is to record the response of a log sensitive to the carbon nuclei in the rock, for example, a carbon/oxygen-ratio log, after the logged well has been produced so that the oil saturation around the well bore represents that in the bulk of the reservoir; next, a purposeful change is made in the region surrounding the well bore by injecting a sufficient quantity of a chemical solvent or combination of solvents to displace substantially all of the oil far enough away from the well bore such that the displaced oil cannot be detected by the logging tool; the log is then run again; the chemical solvent is then itself displaced by brine of previous saline concentration; the log is then run a third time; and finally the oil content of the reservoir is accurately determined from the differences in log responses combined with known properties of the fluids. During the logging steps, the tool does not undergo general calibration (or recalibration), since the present invention involves the utilization of the differences between, rather than the absolute magnitude of, the log signals.

Further objects, features and advantages of the present invention will become more apparent to those skilled in the art from a detailed reading of the following description of preferred embodiments thereof, when taken in consideration with the accompanying drawings.

PREFERRED EMBODIMENTS OF THE INVENTION

Figure 1:
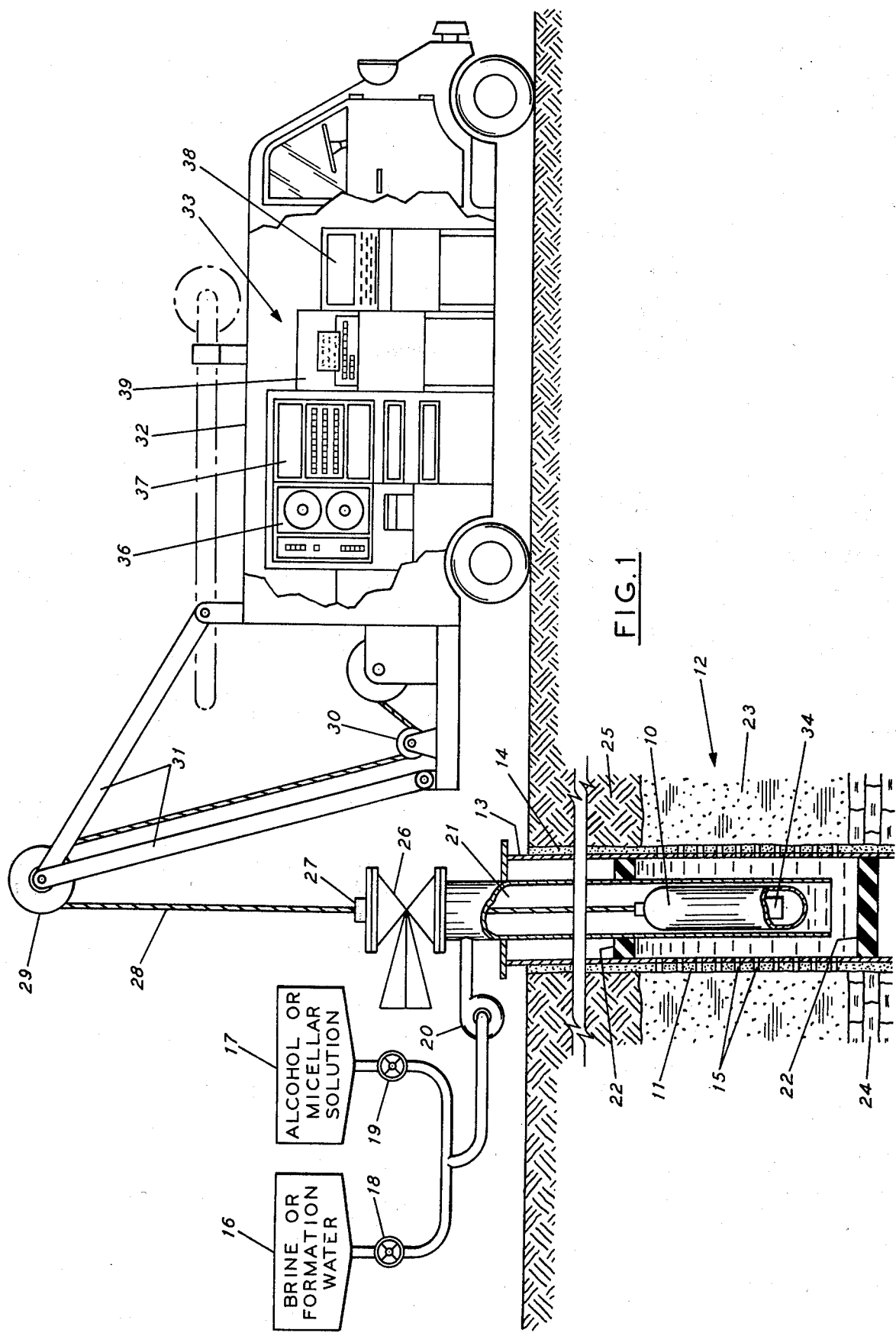
FIG. 1 is a schematic side elevation of a borehole penetrating a reservoir, partially cut away to illustrate a logging sonde connected uphole to a logging truck for carrying out radioactive logging of the reservoir for the determination of oil saturation in the presence, say of water and gas.

Referring now to the drawings, particularly to FIG. 1, there is illustrated a radioactive well logging sonde 10 for carrying out a survey operation within well bore 11, penetrating earth formation 12. The well bore 11 is cased with casing 13 sealed to the formation 12 by cement 14. The casing 13 is perforated to provide openings 15 for production of gas and oil from the formation 12, or for injection of fluids from source tanks 16 or 17 at the earth's surface. The passage of the injection fluids from the tanks 16, 17 is via valves 18, 19 and pump 20 at the earth's surface, and thence downhole through interior tubing 21 into the formation 12. In the arrangement shown, the tubing 21 is packed off from its upper and lower extremities by packers 22. The packers 22 allow the fluids to pass relative to a selected (and isolated) region of the formation 12, say into sandstone stratum 23 between shale and cap rock layers 24 and 25, respectively.

At the earth's surface, the tubing 21 terminates in a connector 26 having an opening 27 through which a logging cable 28 passes. The cable 28 is reeled via sheaves 29 and 30 attached to supports 31 of a logging truck 32 for translation of the logging sonde 10 through the well bore 11.

Constructional characteristics of cable 28 are conventional: it includes a plurality of weight-bearing members surrounding a series of conductors. The ends of the conductors are attached, uphole, to selected elements of control and processing unit 33 within the truck 32 and downhole to a radioactive logging system 34 within the sonde 10.

In general, signals detected by the logging system 34 are recorded on magnetic tape within control and processing unit 33. Their purpose: to provide a suite of logs—in digital format—which represents formational fluid characteristics. Thereafter the suites of logs are manipulated whereby differences between, rather than the absolute magnitudes of, log signals are used to determine oil saturation of the formation 12.

Now in more detail in the detection mode, note that the signal flow is upward from the logging system 34 through the conductors of cable 28 to the control and processing unit 33. Peripherals of the control and processing unit 33 can include a magnetic tape deck 36, where the detected signals can be stored; after a multiplicity of signals have been received and stored, say from a plurality of logging runs, mathematical processing of the suites of logs can occur with processor 37. Of course, the signals of the logging operations are identified on selected tracks of the tape ("suite of logs") at the deck 36. Accommodation of each tape also is provided, say by logging run, and by depth. Each data bit of each "log" is thus identifiable so as to allow its later combination with other logging information in the manner set forth.

Processor 37 is preferably a minicomputer (a relatively low-cost, small, short-word-length (12–16 bits), limited-core-storageable, microprogrammable device). Control of the processor 37 is provided by appropriate software in cooperation with keyboard terminal 38. Display of the results can occur at the keyboard terminal 38 or via printer 39.

Logging system 34 is controlled in concert with selected injection of fluids from source tanks 16 and 17 to provide meaningful logging measurements as the sonde 10 is positioned within the well bore 11. Characteristics of the radioactive system 34 vary with the types of application and data to be indicated, but in general include a detector, a radioactive source and various shields. Many are operated in such manner as to gate the detector means and provide one or more radioactive logs as a function of depth.

Among the many logging systems 34 commercially available for use within the sonde 10 is one which has special relevance in carrying out the method of the present invention: a carbon/oxygen ratio logging system.

Since this log is somewhat indicative of the operations of the elements which comprise the logging system, a brief discussion of carbon/oxygen ratio log seems to be in order and is presented below.

CARBON-OXYGEN LOG

Logging measurements of the relative carbon content in reservoir rocks has been proposed in paper 4640 of Society of Petroleum Engineers of AIME by R. B. Culver, E. C. Hopkinson, and A. H. Youmans, entitled "Carbon Oxygen (C/O) Logging Instrumentation", 1973.

In that system, gamma rays produced by inelastic scattering of neutrons are detected and analyzed by a scintillation spectrometer system. Spectral analysis of the detected radiation allows separation of detected radiation into regions related to scattering by carbon, oxygen, calcium, and silicon nuclei. Currently available instrumentation has been found to be sufficiently accurate to enable detection of oil, but is too dependent on variables unrelated to saturation for measurement of the quantity of oil. Since the uses of the present invention involve steps which vary the character of the formation fluids which can respond to the logging operation ("in situ formation calibration"), currently available carbon-oxygen logging tools can be used for quantitative oil content determination so long as all data are indicated and that data are processed in the manner set forth below.

The responses of current models of such logs are usually presented as the ratio of the total signal counts detected in the energy region reflecting carbon content to the counts detected reflecting oxygen content. The total counts rather than the ratio are used for the measurement of oil saturations.

The number of counts recorded in the energy range sensitive to inelastic scattering of neutrons by carbon nuclei can be described by Equation 1:

$$Sc = \beta_1 + \beta_2 g(\text{carbon}) \tag{1}$$

wherein $Sc$ is the total signal recorded in the energy range corresponding to inelastic scattering of neutrons by carbon;

$\beta_1$ is the total signal in that energy range due to effects other than inelastic scattering by carbon;

$\beta_2$ is a constant reflecting instrumental response in the energy range corresponding to inelastic scattering of neutrons by carbon; and $q$ (carbon) is a function of the carbon content in the well, the casing cement, the reservoir rock, and the hydrocarbons in the porous formation.

Figure 2:
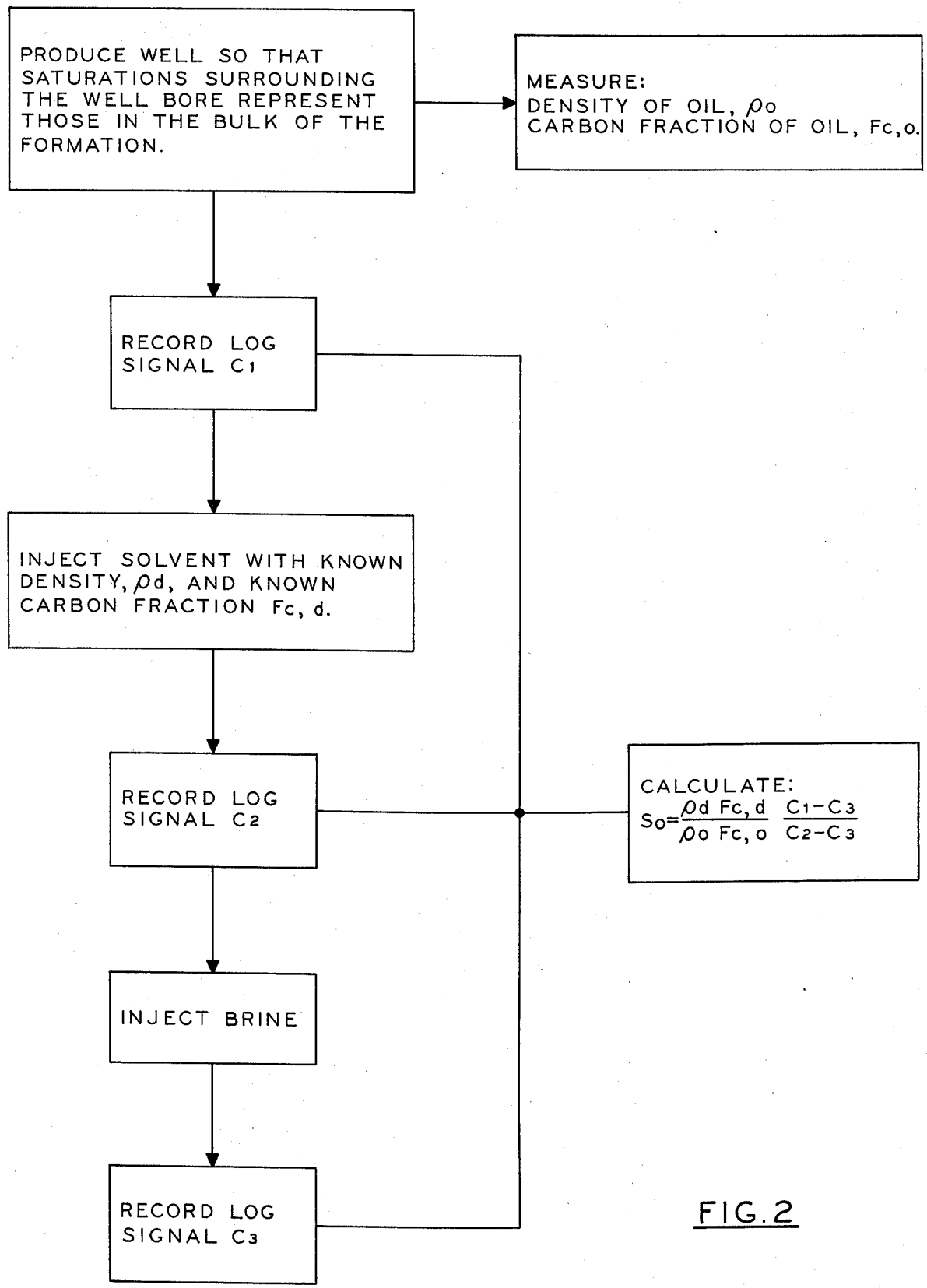
FIG. 2 is a schematic block diagram illustrating the steps used in carrying out the method of the present invention.

FIG. 2 illustrates the steps of the present invention in detail using a carbon/oxygen log.

While carbon/oxygen logging techniques are commercially available to measure parameters of interest related to the formation and formation fluids about the well bore, it is necessary that steps be taken to insure that the fluid content of the region reflects as nearly as possible the fluid content throughout the reservoir. Effects associated with rapid production can be minimized by producing the well slowly or by shutting-in the well for some time before the logs are recorded.

After saturations in the vicinity of the well bore have been made equal to those in the reservoir, the formation can be logged by the carbon/oxygen method previously described.

Assume in FIG. 1 that the sonde 10 is positioned at a depth D and that adjacent formation has been prepared so that fluid saturations about the well bore match those in the rest of the reservoir. The first step consists of logging the formation interval of interest to provide log signals $C_1$. Thereafter a purposeful change is made in this region by injecting into it fluid or fluids from source tank 17, FIG. 1, capable of removing all of the oil, such fluids having known properties, such as known density. One process by which the oil saturation can be removed consists of injecting solvent followed by alcohol; a second consists of injecting a micellar solution preceded, if necessary, by sufficient fresh water to prevent emulsification of the solution. These techniques have been described for use with other well logging methods for example by R. P. Murphy, W. W. Owens, and D. L. Dauben in U.S. Pat. No. 3,757,575. For the measurement process herein described, it has been mentioned that the displacing fluid have known properties. Specifically, it is necessary that the volume fraction of carbon in the displacing fluid be known. If fluids of unknown composition are used, this fraction can be accurately measured with currently available laboratory techniques.

The next step consists of running the log a second time to provide the signal $C_2$ of FIG. 2, while the displacing fluids is in the porous reservoir rock. Because part of the signal recorded by logging tools is determined by the fluid within the well bore, it is desirable to insure that this fluid is nearly the same for all logging runs.

The fourth step of the process consists of injecting enough brine from source tank 16 of FIG. 1 into the formation to insure that the solvent that displaced the oil is itself displaced into the formation beyond the region of tool response. The preferred brine for this step is produced brine.

The fifth step of the invention consists of recording the log response when the formation is filled with the brine described above to provide a log signal $C_3$.

Calculations can then occur at the well site using the processor 37 in truck 32, FIG. 1, to indicate oil saturation. The basis of the calculations is set forth below.

The magnitude of the detected signals from inelastic scattering of neutrons by carbon nuclei when saturations around the well bore equal those in the bulk of the reservoir can be represented by a more detailed form of Equation 1, supra:

$$C_1 = \beta_1 + \beta_2 \, g(\tau_f, \tau_c, \tau_r, \tau_{p,1}) \tag{2}$$

wherein $C_1$ is the total signal recorded at a particular depth;

$q(\tau_f, \tau_c, \tau_r, \tau_{p,1})$ is a function reflecting relative sensitivity of the radiation source - detector combination to the carbon nucleus density of the fluids in the well bore, the cement surrounding the casing, the rock matrix in the reservoir around the well bore, and the fluids in the pore fraction of the matter around the well bore;

$\tau_f$ is the density of carbon nuclei in the fluids in the well bore;

$\tau_c$ is the density of carbon nuclei in the cement surrounding the casing;

$\tau_r$ is the density of carbon nuclei in the reservoir rock matrix;

$\tau_{p,1}$ is the density of carbon nuclei in the fluids in porous part of the matter around the well bore under original conditions. The carbon density can be expressed by Equation 3:

$$\tau_{p,1} = \phi \rho_o S_o F_{c,o} V \tag{3}$$

wherein $\phi$ = the porosity of the formation; formation;
$\rho_o$ = the density of oil in the formation;
$S_o$ = the oil saturation representative of the reservoir;
$F_{c,o}$ = the ratio of the mass of carbon to the over-all mass of oil at reservoir conditions; and
$V$ = the effective volume sensed by the log.

The magnitude of the signal of the second log run after injection of a fluid which saturates the formation, $C_2$, can be described by Equation 4:

$$C_2 = \beta_1 + \beta_2 \, g(\tau_f, \tau_c, \tau_r, \tau_{\rho,D}) \qquad (4)$$

Here, $\tau_{\rho,D} = \phi \, \rho_d F_{c,d} V$ (5)

wherein $\rho_d$ = the density of the displacing fluid;
$F_{c,d}$ = the ratio of the mass of carbon to the over-all mass of the displacing fluid. The displacing fluid is itself displaced by brine. The salinity of the brine is not important to the carbon-log measurement of oil content, so formation brine can be used. The response of the third log run after injection of the formation brine, $C_3$, can be described by the Equation 6.

$$C_3 = \beta_1 + \beta_2 \, g(\tau_f, \tau_c, \tau_r, 0) \qquad (6)$$

where the term describing the carbon content of fluids in the pores is set to zero, reflecting the fact that brine has no carbon content.

Oil saturation can be computed from the differences in the carbon log responses described above and from density and carbon fractions measured uphole. The ratio between differences of recorded signals can be represented by the Equation 7:

$$\frac{C_1 - C_3}{C_2 - C_3} = \frac{g(\tau_f, \tau_c, \tau_r, \tau_{\rho,1}) - g(\tau_f, \tau_c, \tau_r, 0)}{g(\tau_f, \tau_c, \tau_r, \tau_{\rho,2}) - g(\tau_f, \tau_c, \tau_r, 0)} \qquad (7)$$

$$= \frac{\frac{\delta g}{\delta \tau_\rho} \phi \rho_o S_o F_{c,o} V}{\frac{\delta g}{\delta \tau_\rho} \phi \rho_d F_{c,d} V}$$

$$= S_o \frac{\rho_o F_{c,o}}{\rho_d F_{c,d}}$$

The oil saturation is thus found from Equation 8:

$$S_o = \frac{\rho_d F_{c,d}}{\rho_o F_{c,o}} \cdot \frac{C_1 - C_3}{C_2 - C_3} \qquad (8)$$

Since the carbon/oxygen ratio log presents data related to inelastic scattering of neutrons by oxygen as well as by carbon, the above log signal can also be used to calculate water saturations as taught in my copending application filed concurrently herewith.

ILLUSTRATIVE EXAMPLE

The following is an example of the use of data related to the inelastic scatter of neutrons by carbon and oxygen nuclei to measure oil saturation in the formation surrounding a producing well. In the well, assume that oil saturation has been reduced by previous production and that some gas saturation has been produced. Also, the salinity of formation brine is assumed to be too low to allow quantitative use of pulsed-neutron-capture logs for conventional oil saturation measurement.

Assuming that steps have been taken to assure that saturations surrounding the well bore represent those in the bulk of the formation, the first step of the method of the present invention consists of recording the signals $C_1$ from inelastic scattering by both carbon and oxygen nuclei. The signal recorded for carbon (i.e., the total counts recorded in the range of energies associated with inelastic scatter by carbon nuclei for a particular accumulation time, which is constant throughout the measurement process) is 19,200 counts.

The next step is accomplished by injection of a miscible solvent followed by enough isopropanol to insure complete displacement of the solvent several feet away from the well bore. This injection is accomplished by setting a plug below and a packer above the interval logged. After the injection step is completed, the packer is unseated and enough produced brine is injected to replace the alcohol in the annulus between tubing and casing. This insures that the same fluids are present within the well bore at each logging step so that differences in logged values reflect only changes of the fluids in the formation.

The next step consists of running the carbon/oxygen-ratio log a second time at the same depth investigated previously. The total signal recorded for carbon is 22,100 counts.

The next step consists of injection of enough brine (10,000 ppm NaCl) to displace the isopropanol several feet away from the well bore.

The final step consists of a third recording of the carbon/oxygen-ratio The signal recorded for carbon is 15,050 counts.

In order to calculate the oil saturations, it is necessary to use the following constants:

Fractional mass of carbon is isopropanol, $F_{c,d} = 0.60$
Fraction mass of carbon in reservoir crude, $F_{c,o} = 0.86$
Oil density = 0.98
Density of isopropanol at reservoir temperature, $\rho_d = 0.757$ g/cm$^2$ Equation (8) is evaluated:

$$S_o = \frac{0.757 \times 0.60}{0.98 \times 0.86} \cdot \frac{19,200 - 15,050}{22,100 - 15,050} = 0.32$$

MODIFICATION

In some applications, it is possible to omit the last injection of brine surrounding the well bore and the subsequent logging of the fluid by the logging system depicted in FIG. 1. For the modification to be effective, it must be recognized from the data that a given depth interval in the well has properties substantially equivalent to the tested interval of interest and the former is known to contain no oil. Oil saturation is then calculated using the signal recorded in this region in place of the signals recorded through the tested interval after the final injection stage.

Also, replacement of the displacing fluid within the cased hole can often be accomplished by unseating the packer used to seal off the interval of interest and injecting produced brine. Since this brine is heavier than the displacing fluid, the lower part of the hole can be filled with the brine without raising the pressure enough to cause the brine to be injected into the formation. It is often useful to put enough brine into the hole so that it fills the hole through not only the formation of interest but also another region in the hole. Logs recorded through this latter region can be used to check the log response.

While specific embodiments of the invention have been described in detail, it should be understood that the invention is not limited thereto as many variations will be readily apparent to those skilled in the art, and this invention is to be given the broadest possible interpretation within the terms of the following claims.

What is claimed is:

1. A method of measuring the concentration of oil in an earth formation constituting a given depth interval of the region surrounding a well bore, comprising:
    a. running, over said given depth interval, a log whose response to the carbon content of said region is substantially linear throughout the range of expectable carbon contents,
    b. injecting into said region a solvent capable of replacing substantially all of the previous fluids in the part of said region to which said log is responsive,
    c. running said log a second time to obtain signals changed from those of the first running, the changes reflecting the effects of Step (b),
    d. injecting brine to replace substantially all of said solvent within the part of said region to which said log is responsive,
    e. running said log a third time to obtain signals changed from those of the second running, the changes reflecting the effects of Step (d),
    f. calculating the oil concentration from the measured difference in the signals from Steps (a), (c), and (e).

2. The method of claim 1 in which said response to said carbon content is based on the detection of gamma rays resulting from the inelastic scattering of neutrons by carbon nuclei.

3. The method of claim 1 in which possible changes in log sensitivity between logging runs are compensated by recording log response through another depth interval in the well which is not affected by injected fluids.

4. The method of claim 1 in which the injection Steps (b) and (d) are followed by substeps in which the fluid within the well bore itself is restored to a composition having substantially the same effect on the log as did the fluid that was in said well bore during Step (a).

5. A method of measuring the concentration of oil in an earth formation constituting a given depth interval of a region surrounding a well bore, comprising:
    a. running, over said given depth interval, a log whose response to the carbon content of said region is substantially linear throughout the range of expectable carbon contents, and running, over another depth interval known to contain substantially no oil, the same said log;
    b. injecting into said region adjacent to said given depth interval a solvent capable of replacing substantially all of the previous liquids in the part of said adjacent region to which said log is responsive;
    c. running said log over said given depth interval a second time to obtain signals changed from those of the first running, the changes reflecting the effects of Step (b);
    d. calculating the oil concentration from the measured difference in the signals from Steps (a) and (c).

6. A method of measuring the concentration of oil in an earth formation constituting a given depth interval of the region surrounding a well bore, comprising:
    a. running, over said given depth interval, a log whose response to the carbon content of said region is substantially linear throughout the range of expectable carbon contents,
    b. injecting into said region a solvent capable of replacing substantially all of the previous fluids in the part of said region to which said log is responsive,
    c. running said log a second time to obtain signals changed from those of the first running, the changes reflecting the effects of Step (b),
    d. injecting brine to replace substantially all of said solvent within the part of said region to which said log is responsive,
    e. running said log a third time to obtain signals changed from those of the second running, the changes reflecting the effects of Step (d),
    f. calculating the oil concentration from the measured difference in the signals from Steps (a), (c), and (e) in accordance with the equation wherein
$C_1$, $C_2$, and $C_3$ refer to log responses recorded in Steps (a), (c) and (e), respectively;
$\rho_d$ = density of liquid in the formation after Step (b);
$F_{c,d}$ = ratio of the mass of carbon to the total mass of the above-specified liquid;
$\rho_o$ = density of oil in the formation;
$F_{c,o}$ = ratio of the mass of carbon to the total mass of said oil; and
$S_o$ = fraction of the pore volume containing oil.

7. A method of measuring the concentration of oil in an earth formation constituting a given depth interval of a region surrounding a well bore, comprising:
    a. running, over said given depth interval, a log whose response to the carbon content of said region is substantially linear throughout the range of expectable carbon contents, and running, over another depth interval known to contain substantially no oil, the same said log;
    b. injecting into said region adjacent to said given depth interval a solvent capable of replacing substantially all of the previous liquids in the part of said adjacent region to which said log is responsive;
    c. running said log over said given depth interval a second time to obtain signals changed from those of the first running, the changes reflecting the effects of Step (b);
    d. calculating the oil concentration from the measured difference in the signals from Steps (a) and (c) in accordance with the Equation:

wherein
$C_1$ and $C_2$ refer to recorded log responses at said given depth interval in Steps (a) and (c);
$C_3$ refers to a recorded log response at said another depth interval known to contain substantially no oil;
$\rho_d$ = density of liquid in the formation after Step (b);
$F_{c,d}$ = ratio of the mass of carbon to the total mass of the above-specified liquid;
$\rho_o$ = density of oil in the formation; and
$S_o$ = fraction of the pore volume containing oil.

* * * * *

UNITED STATES PATENT AND TRADEMARK OFFICE
CERTIFICATE OF CORRECTION

PATENT NO. : 3,993,902
DATED : November 23, 1976
INVENTOR(S) : Charles H. Neuman It is certified that error appears in the above—identified patent and that said Letters Patent are hereby corrected as shown below:

In Abstract, line 8, "fuel" should read --fluid--.

Col. 10, line 24, and col. 10, line 54 insert the equation $$S_o = \frac{\rho_d F_{c,d}}{\rho_o F_{c,o}} \frac{C_1 - C_3}{C_2 - C_3}$$

Signed and Sealed this

Fifteenth Day of February 1977

[SEAL]

Attest:

RUTH C. MASON
Attesting Officer

C. MARSHALL DANN
Commissioner of Patents and Trademarks